United States Patent [19]

Kolosov et al.

[11] 4,245,584

[45] Jan. 20, 1981

[54] APPARATUS FOR APPLYING PASTE UPON BLANK STRIPS FOR CERMENT ELECTRODES OF ALKALINE STORAGE BATTERIES

[76] Inventors: Ivan A. Kolosov, ulitsa Astrakhanskaya, 118, kv. 54.; Nikolai V. Kuryshev, ulitsa Ordzhonikidze, 6, kv. 11., both of Saratov, U.S.S.R.

[21] Appl. No.: 11,040

[22] Filed: Feb. 9, 1979

[51] Int. Cl.³ .................................................. B05C 3/00
[52] U.S. Cl. .................................. 118/407; 118/405; 118/411; 118/412; 141/1.1; 141/2
[58] Field of Search ............... 118/405, 407, 411, 412; 141/1.1, 2

[56] References Cited

U.S. PATENT DOCUMENTS

| | | | |
|---|---|---|---|
| 2,787,980 | 4/1957 | McDermott | 118/405 |
| 3,197,324 | 7/1965 | Brooks | 118/407 |
| 3,950,464 | 1/1976 | Wallsten | 118/411 |
| 4,062,492 | 12/1977 | Thornton | 118/411 |
| 4,063,531 | 12/1977 | Zitzow | 118/411 |
| 4,133,917 | 1/1979 | Walsten | 118/405 |

*Primary Examiner*—Jack P. Brammer
*Attorney, Agent, or Firm*—Lackenbach, Lilling & Siegel

[57] ABSTRACT

Disclosure is made of an apparatus for applying paste upon blank strips for cermet electrodes of alkaline storage batteries. The backing strip is advanced by a drive through a bin filled with the paste. This bin is made in the form of two autonomous reservoirs having in their respective lower portions, in the walls thereof facing each other, ports with edges through which the paste can leave the reservoirs. The upper edges of these ports define, upon said reservoirs having closed upon the backing strip, an application nozzle having centering lugs made on the edges of the ports, to center the backing strip with respect to the application nozzle.

7 Claims, 5 Drawing Figures

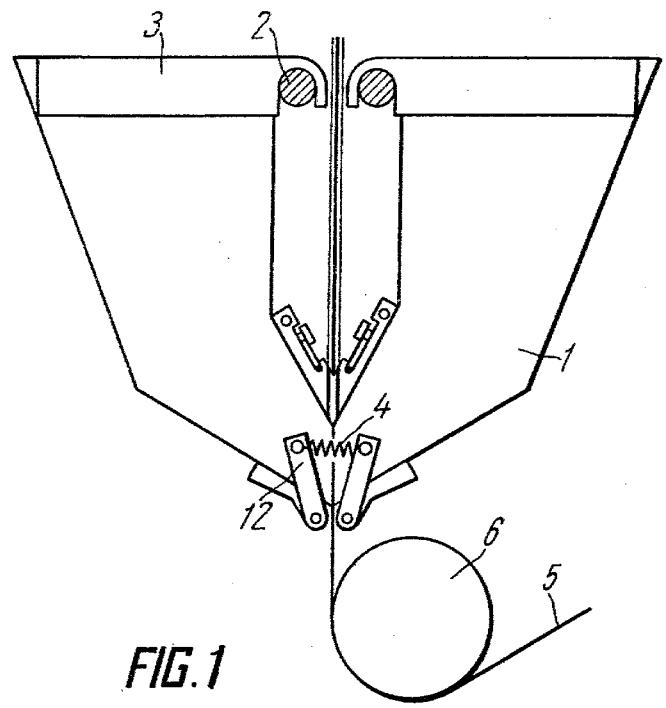

APPARATUS FOR APPLYING PASTE UPON BLANK STRIPS FOR CERMENT ELECTRODES OF ALKALINE STORAGE BATTERIES

FIELD OF THE INVENTION

The invention relates to manufacture of storage batteries, and, more particularly, it relates to an apparatus for applying paste onto blank strips for metal-ceramic or cermet electrodes of alkaline storage batteries.

The disclosed apparatus can be utilized in the production of storage batteries of the nickel-cadmium type of practically all modifications of such batteries, providing for increased efficiency of the paste-application process and enhancing the quality of the cermet electrodes.

The problem of mechanization of the operation of applying paste onto blank strips for cermet electrodes of alkaline storage batteries is complicated by the fact that the thickness of pasted strips for storage batteries with a high storage capacity, e.g. for batteries used in aircraft, in electromobiles, etc. is selected within a range from 0.4 to 0.7 mm, which renders awkward the use of the hitherto known apparatus.

DESCRIPTION OF THE PRIOR ART

The hitherto known machines for applying paste onto the electrodes of acid storage batteries comprise a bin with the paste, mounted above a conveyor adapted to advance electrode blanks coming from a feeder. The paste from the bin is fed onto the blank while it moves under the bin on the conveyor. The paste is forced into the blank by doctor blades mounted at an angle to the plane of the advance of the blanks. These known machines have been found to operate reliably with an electrode thickness greater than or equal to 1 mm. It has become common practice to apply paste onto electrodes thinner than 1 mm manually, by means of handheld doctor blades, with the electrodes lying on a planar table.

There is also known an apparatus for applying paste onto a backing strip, for cermet blank strips for cermet electrodes of alkaline storage batteries, comprising a bin filled with the paste, the lower portion thereof accommodating a roller directing the backing strip advancing through the bin vertically upward. Mounted above the bin is a gauging nozzle through the slit of which the backing strip is directed upon its having taken thereupon the paste from the bin. As the backing strip is made to pass through this slit nozzle, the surplus paste is taken off the strip by the gauging edges of this nozzle. Internally of the slit of the nozzle, there are mounted guiding lugs facing one another, the lugs being uniformly spaced and directed along the direction of the advance of the backing strip onto which the paste is applied. The gap between the opposing lugs equals the thickness of the backing strip being pasted and is intended to center the strip in the gauging slit of the nozzle.

It is also known that in factories of the French "Saft" company, which is a leading manufacturer of storage batteries with pasted baked electrodes, the paste is applied onto backing strips in similar apparatus comprising a bin with the paste, through which the backing strip is advanced, and a gauging nozzle (or else, gauging rules) providing for the required thickness of the backing strip with the paste applied thereupon.

However, the hitherto known apparatus are not free from the following disadvantages.

While being pasted in the aforementioned hitherto known apparatus, the backing strip is advanced through the paste upwardly, so that the paste is taken up owing to its viscosity, which has been found to be not a sufficient guarantee that every perforation of the backing strip is filled with the paste, i.e. of the adequate quality of the application of layer of the paste onto the backing strip. Furthermore, in the aforementioned apparatus the blank strips are coated across the entire width of the backing strip, so that upon the electrodes having been cut therefrom, the areas for connection of current leads have to be cleaned manually of the baked paste.

The centering lugs of the nozzle, directed along the direction of the advance of the backing strip being coated, leave clearly discernible traces in the paste coating, which more often than not form cracks after the baking. Moreover, when a backing strip perforated from both sides is being coated, the strip having rows of small projections or burrs directed to both sides of the strip, the centering lugs indexed longitudinally of the advance of the strip being coated would not dependably provide for the required accuracy of the positioning of the backing strip centrally of the layer being applied, on account of the lugs being liable in certain areas to get between these rows and thus to cause local non-uniformity of the layer being applied, which likewise might lead to warping and cracking of the baked layer in finished electrodes.

SUMMARY OF THE INVENTION

It is an object of the present invention to provide an apparatus for applying paste onto extra-thin blank strips for cermet electrodes of alkaline storage batteries.

It is another object of the present invention to increase the efficiency of the coating process and to enhance the quality of cermet electrodes cut off the coated and baked blank strips.

These and other objects are attained in an apparatus for applying paste onto blank strips, for cermet electrodes of alkaline storage batteries, comprising a bin with the paste, through which a perforated backing strip is advanced by a drive, and a nozzle with centering lugs, providing for the required thickness of the blank strip with the paste applied thereupon. In accordance with the present invention, the bin is made up by two autonomous reservoirs having made in the lower portions thereof, at their lateral sides, ports for exit of the paste, the ports facing each other as the strip is being advanced through the bin, the nozzle being formed by the upper edges of the respective ports of the two reservoirs, as the reservoirs close upon the strip.

It is preferable that flaps should be mounted along the side edges of the ports of each reservoir, and connected with springs urging the end of each flap to engage the blank strip, so as to limit the width of the coated portion of the strip. The lower edge of each port should be sealed by means of an elastic film of which the free edge passes into the bin jointly with the backing strip, the elastic film being urged against the strip by the pressure of the paste.

It is also preferable that the upper edge of the port of each reservoir should have mounted therealong inclined combs with plate-like teeth adapted to center the backing strip by their working ends. Gauging plates should be provided and connected with the comb by set screws, for adjustment of the thickness of the layer being applied.

It is also preferable that the working ends of the plate-like teeth of the comb, extending in the paste-application plane, should be arranged at an angle to the vertical axis of the application nozzle. The gauging plates should have chamfered lower edges, to define a space for filling up the traces of the comb in the layer being applied.

An apparatus for applying paste upon blank strips for cermet electrodes of alkaline storage batteries, constructed in accordance with the present invention, increases the efficiency of the coating process, owing to the coating of the blank strip being effected from the lower strata of the paste and urged against the strip by the hydrostatic pressure of the paste column in the reservoir, which eliminates contact of the layer of the coating with the upper, more liquid strata of the paste in the bin, should stratification of the paste in the bin occur. Furthermore, this apparatus provides for quickened filling of the perforations of the strip with the paste which enables an increase of feed the speed of the strip, and thus an increase in the throughput of the apparatus.

With the bin being in the form of two autonomous reservoirs or vessels which can be easily replaced with others with different dimensions of the ports (by the width of the coated portion of the strip) without the necessity of halting the entire plant and breaking the backing strip, the herein disclosed apparatus is profitably fit for small-lot production conditions.

Besides, the disclosed structure of the bin decreases resistance to the progress of the blank strip between the reservoirs, which permits the coating of extra-thin backing strips, as thin as 20 to 50 microns.

The provision at the laternal edges of the ports of each reservoir of a flap with a spring urging the end face of the flap against the backing strip enables a clear borderline between the coated and uncoated portions to be defined, this being required for connecting current leads upon electrodes having been cut or punched from the blank strip. The reservoirs are designed so that they should be capable of applying a coating band either centrally or edgewise of the strip, with the ports of the reservoirs being divided by a partition with flags. It is possible to have reservoirs journalled on parallel rods and thus to make them movable in the plane of the strip perpendicularly of the progress thereof from an automatic actuator, e.g. forming a part of known per se automatic control systems, thus providing for the required accuracy of the position of the applied layer relative to the borderline of the perforations, under the conditions of practically inavoidable drift of the strip across the rollers, particularly in case of extra thin strips.

The combs with plate-like teeth and the gauging plates mounted in an inclined position along the upper edge of the port of each reservoir enhance the accuracy of the control of the thickness of the layer being applied. Thus, with the gauging plate being inclined at 30° to a vertical line, its adjustment by 1 mm varies the thickness of the slit by 0.5 mm.

With the working end faces of the plate-like teeth of the comb being positioned at an angle to the direction of the advance of the backing strip, and with the edge of the gauging plate being chamfered, there is ensured accurate centering of the backing strip relative to the layer being applied and filling up of the traces left by the teeth of the comb in the coated blank strip, which precludes warping of the blank strip during baking, and also crack formation, whereby the quality of the coated baked electrodes of alkaline storage batteries is enhanced.

BRIEF DESCRIPTION OF THE DRAWINGS

The present invention will be further described in connection with embodiments thereof, with reference being had to the accompanying drawings, wherein:

FIG. 1 is a front elevational view of the apparatus for applying paste onto blank strips for cement electrodes of alkaline storage batteries;

FIG. 2 is a front cross-sectional view of one of the reservoirs;

DETAILED DESCRIPTION OF THE INVENTION

Figure 3:
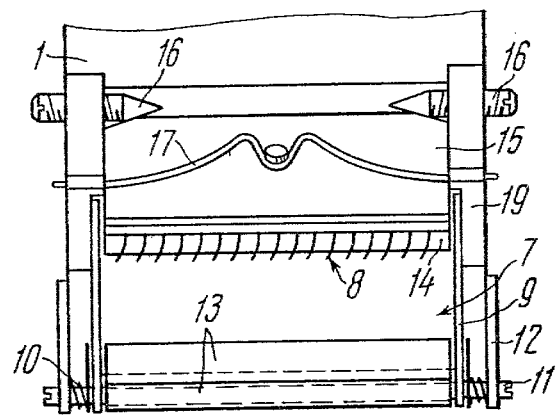
FIG. 3 is a view of one of the reservoirs looking from the backing strip.

Referring now to the appended drawings, the apparatus for applying paste onto blank strips of cermet electrodes of storage barreries, embodying the present invention, includes a supply bin made in the form of two autonomous reservoirs 1 (FIGS. 1 and 2) suspended from two parallel bars 2 by means of journals 3 fixed at the upper portions of the reservoirs 1. The bottom portions of the reservoirs 1 are urged from the both side springs 4, i.e. they are urged against the backing strip 5 passing between the reservoirs 1 in the process of coating. The backing strip 5 unwound from a supply bobbin (not shown) passes over a roller 6 mounted underneath the bin, moves vertically upward into a baking oven, wherein the blank strip having the layer of paste is dried and baked, and advances from the oven onto a positively driven take-up bobbin (not shown) which pulls the strip through the entire apparatus.

The lower portion of each reservoir 1 (FIGS. 2 and 3) is provided with a rectangular port 7 defined by the lateral edges of the reservoirs 1, the ports 7 of each reservoir facing each other to apply paste onto the backing strip 5 being pulled through the gap between the reservoirs 1.

The upper edges of the two ports 7 (FIG. 2) of each reservoirs 1 define, upon the reservoirs 1 closing on the backing strip 5, an application nozzle with two centering lugs 8. Mounted at the lateral edges of the ports 7 of the two reservoirs 1, in slots provided for the purpose, are flaps 9 (FIG. 3) provided with compression springs 10 urging the flaps 9 outwardly from the slots and pressing their end faces against the backing strip 5 being coated. The flaps 9 and the springs 10 are received at both sides about a bar 11 fixed in strips 12 and extending along the lower edge of each reservoir 1. The central portion of the bar 11 has wound thereabout a length of an elastic film strip 13 of which the free end is passed into the zone of the port 7 of each reservoir 1, to seal the bottom slit between the reservoirs 1 during a coating operation.

Mounted in an inclined position at the upper edges of the ports 7 of each reservoirs 1 are combs 14 (FIGS. 2, 3 and 4) with plate-like teeth of which the working ends act as the centering lugs 8. The comb 14 mounted at the upper edge of each port 7 has attached thereto gauging plates 15 connected to the comb 14 with screws 16

(FIGS. 2 and 3) and a spring 17, to provide for adjustment of the thickness of the coating layer of the paste.

The working ends 18 (FIGS. 2, 4 and 5) of the plate-like teeth of the comb 14, engaging the plane of the backing strip during a coating operation, extend at an angle of 30° to 40° to the vertical axis of the application nozzle, coinciding with the direction of advance of the backing strip 5 during the coating operation. The comb 14 also has abutment ends 19 (FIGS. 2 and 3) disposed in the same plane with the working ends 18 of the plate-like teeth of the comb 14.

The angle of inclination of the working ends 18 is set to preclude them from getting between adjacent rows of projections on the backing strips 5 (or else into the perforations in this backing strip 5). The spacing of the teeth is selected to be within the range of about 10 mm to 15 mm, in accordance with the rigidity of the backing strip 5. In this case the abutment ends 19, the working ends 18 and the gauging edge 20 of the plate 15 should be finally machined jointly in the assembled state of the apparatus, with the set screws 16 turned for maximum projection of the plate 15.

Each plate 15 (FIG. 4) has made in the bottom edge thereof, below the gauging plane 20, a chamfer 21 adapted to define a space A when the two reservoirs 1 close upon the backing strip 5.

In this space A, as the backing strip 5 is moving with the paste coating 22 applied thereonto and as the thickness of this coating is being gauged by the gauging planes 20, surplus paste accumulates, this surplus paste being consumed by its filling up the traces left by the working ends 18 in the coating layer.

The height of the gauging planes 20 is selected in accordance with the viscosity of the paste, so that with the backing strip 5 held immobile,1 and the reservoir 1 being filled with paste to the brim, the paste would not flow through the gaps between the gauging planes 20 and the backing strip 5. The lateral size of the chamfer 21 is selected to correspond to the height of the gauging plane 20, in a ratio of either 1:2 or 1:3.

The apparatus embodying the present invention operates as follows.

Before the coating operation, the backing strip 5 (FIG. 1) is unwound from the supply bobbin (not shown), threaded about the roller 6 into the drying and baking oven and secured to the take-up bobbin connected to the drive (not shown) which, as has been already stated, pulls the backing strip 5 through the apparatus. Usually for the initial threading operation a length of auxiliary material, similar to that of the backing strip 5, is used and connected to the leading end of the supply bobbin of the backing strip 5. This done, the oven is heated to the required temperature and filled with protective gases.

The thickness of the coating layer is preset on each side of the backing strip 5, by placing a ruler onto the abutment ends 19 (FIGS. 2 and 3) and turning the set screws 16, so as to set the required gap between the ruler and the gauging plane 20 (FIGS. 2 and 4), which gap is to be measured, e.g. with a thickness gauge.

After the gaps are set at each reservoir 1 (FIG. 1), the reservoirs are mounted by their journals 3 on the rods 2 and then closed upon the backing strip 5, checking meanwhile the correctness of the position of the flaps 9 and of the free edge of the film strip 13 (FIGS. 1 and 2). Thereafter the reservoirs 1 are interconnected with the springs 4, the tension of these springs 4 being adjusted so that the working ends 18 (FIG. 4) of the centering lugs 8 should snugly engage the backing strip 5 over the entire width of the backing strip 5, while permitting motion of the backing strip 5 with a minimum pulling effort through the slit of the application nozzle.

Figure 4:
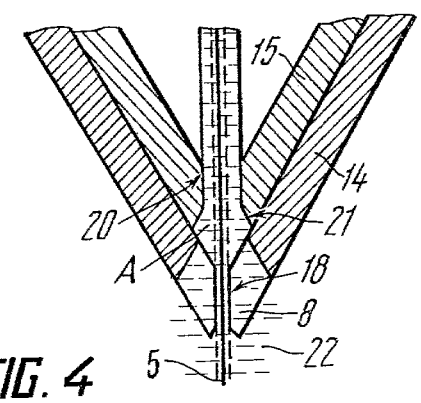
FIG. 4 is a front cross-sectional view of the application nozzle.
Figure 5:
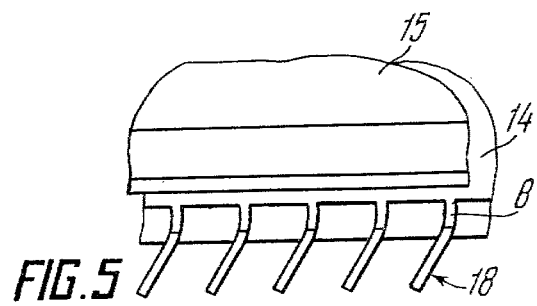
FIG. 5 is a view of the application nozzle looking from the backing strip.

This done, the reservoirs 1 (FIG. 1) are filled with the paste, and the transport drive of the backing strip 5 is energized. The paste 22 (FIG. 4) urged against both side of the backing strip 5 by hydrostatic pressure of the paste column in each reservoir 1 is taken by the moving strip 5 and carried thereby past the comb 4 toward the gauging nozzle defined by the planes 20 (FIG. 4). Surplus paste in partly removed by the back side of the inclined comb 14, and the remaining surplus paste is removed by the nozzle, whereby a back flow of the paste is created, filling up the traces left by the working ends 18 of the comb 14 in the coating layer.

The thus coated strip is dried and baked in the oven to provide a porous backing for a cermet backing strip for electrodes of alkaline storage batteries. The baked blank strip is directed for further processing according to the adopted technology.

An apparatus in accordance with the present invention permits paste to be coated on blank strips having limited thickness and strength for cermet electrodes for alkaline storage batteries. It provides for an increased rate of feed of the strip and enhancement of the quality of the coating. This is achieved because the bin is made made in the form of two autonomous reservoirs 1 (FIG. 1) with lateral ports 7 for exit of the paste in the lower portion of these reservoirs, whereby the strip is coated with the lowermost layer of paste, the most dense layers of the paste, urged against the strip by the hydrostatic pressure of the paste column in the bin.

The provision at the laternal edges of the ports 7 (FIG. 3) of flaps 9 having their ends engaging the backing strip 5 under the action of the strips 10 enables application of the paste onto the backing strip 5 with either side margins or a central band being left devoid of the paste, which simplifies the process of making current leads upon the electrodes having been cut off the baked and processed blank strip.

With the combs 14 (FIG. 4) with the centering lugs 8 and gauging plates 15 being mounted to engage the backing strip 5, the combs and the plates being arranged along the upper edge of the ports 7 at an angle to the plane of the latter, the accuracy of adjustment of the thickness of the coating layer is enhanced, and better conditions are provided for mixing the paste in the area where the backing strip 5 is being coated.

With the working ends 18 (FIG. 2) of the plate-like teeth of the comb 14 being arranged at an angle to the direction of the advance of the backing strip 5 being coated, and with the gauging plate 15 having its lower edge chamfered, whereby a space is defined above the centering lugs 8, the operation of centering the backing strip 5 in the slit of the application nozzle is made more reliable. Warping of the blank strip and crack formation therein are also precluded. Besides, with the reservoirs 1 (FIG. 1) being suspended from two paralled rods 3 by the journals 3 of the reservoirs an both sides of the backing strip 5, it has become possible to replace the reservoirs with different ones in the process of coating, i.e. to coat blank strips of different sizes and types, which makes the apparatus particularly suitable for small-lot production conditions. Moreover, it is possible to follow automatically the position of the margin of the coated layer relative to the borderline of the perforations by automatically shifting the reservoirs 1 along the rods 2, to compensate for the drift of the backing strip 5.

What we claim is:

1. An apparatus for applying paste upon blank strips for cermet electrodes of alkaline storage batteries, comprising:
    a drive;
    a bin containing said paste and through which a backing strip is advanced by said drive, said bin including two independent reservoirs, one on each side of said backing strip, a port being defined in a lower portion of each reservoir, said ports being aligned on a respective side of said backing strip for paste to flow from a respective reservoir through said port onto a surface of the respective side of said backing strip;
    an application nozzle defined by upper edges of said ports when said reservoirs are closed against said backing strip; and combs mounted along said upper edges of respective ports and being angled with respect to a direction of advancement of said backing strip, working ends of teeth of each comb interacting with said backing strip to center said backing strip within said bin.

2. An apparatus for applying paste upon blank strips according to claim 1, further comprising gauging plates connected to respective combs by screw means for adjusting the distance between said combs and said backing strip, and chamfered lower ends of said gauging plates defining a space wherein surplus paste can spread into the surface area of the backing strip from which paste was removed by said combs.

3. An apparatus for applying paste upon blank strips according to claim 1, further comprising flaps mounted on edges of said ports and being resiliently urged against said backing strip to define surfaces on said backing strip which will not be coated with said paste.

4. An apparatus for applying paste upon blank strips according to claim 2, further comprising flaps mounted on edges of said ports and being resiliently urged against said backing strip to define surfaces on said backing strip which will not be coated with said paste.

5. An apparatus for applying paste upon blank strips according to either of claims 1, 2, 3 or 4, further comprising elastic films mounted in respective reservoirs to seal a bottom slit between said reservoirs.

6. An apparatus for applying paste upon blank strips according to claim 1, wherein said working ends of said teeth of said combs are inclined at an angle from about 30° to 40° relative to said direction of advancement of said backing strip.

7. An apparatus for applying paste upon blank strips according to claim 1, wherein said backing strip is advanced in a vertical plane.

* * * * *